(12) United States Patent
Fischbach

(10) Patent No.: US 11,556,939 B2
(45) Date of Patent: Jan. 17, 2023

(54) METHOD FOR PROVISIONING A CONTAINER WITH FOOD

(71) Applicant: N.V. Nutricia, Zoetermeer (NL)

(72) Inventor: Elmar Martin Fischbach, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 303 days.

(21) Appl. No.: 16/771,692

(22) PCT Filed: Dec. 18, 2018

(86) PCT No.: PCT/NL2018/050849
§ 371 (c)(1),
(2) Date: Jun. 11, 2020

(87) PCT Pub. No.: WO2019/125146
PCT Pub. Date: Jun. 27, 2019

(65) Prior Publication Data
US 2021/0065209 A1    Mar. 4, 2021

(30) Foreign Application Priority Data

Dec. 18, 2017  (WO) ................ PCT/NL2017/050844

(51) Int. Cl.
*G06Q 30/00*    (2012.01)
*B65B 1/04*    (2006.01)
(Continued)

(52) U.S. Cl.
CPC ........... *G06Q 30/0185* (2013.01); *B65B 1/04* (2013.01); *B65B 7/2842* (2013.01); *B65B 61/26* (2013.01);
(Continued)

(58) Field of Classification Search
CPC .... B65D 2203/08; B65D 43/16; B65D 51/20; B65D 51/247; B65D 2251/0021; B65D 2251/0093; B65D 2203/06; B65D 2401/15; B65B 7/2864; B65B 7/2878; B65B 7/01; B65B 1/04; B65B 7/2842; B65B 61/26;
(Continued)

(56) References Cited

U.S. PATENT DOCUMENTS

| | | | | |
|---|---|---|---|---|
| 9,365,332 B2 * | 6/2016 | Jentis | ..................... | G01F 19/002 |
| 2014/0097183 A1 * | 4/2014 | McGrath | ............. | B65D 43/169 |
| | | | | 220/212 |
| 2014/0299567 A1 * | 10/2014 | Vogel | ..................... | B65D 23/12 |
| | | | | 53/421 |
| 2015/0206227 A1 * | 7/2015 | Borom | ............... | G06Q 30/0601 |
| | | | | 705/26.7 |

(Continued)

FOREIGN PATENT DOCUMENTS

| | | | |
|---|---|---|---|
| CN | 203520422 U | 4/2014 | |
| EP | 3144240 A1 | 3/2017 | |

(Continued)

*Primary Examiner* — Kareen K Thomas
(74) *Attorney, Agent, or Firm* — N.V. Nederlandsch Octrooibureau

(57) ABSTRACT

Method for providing a container with food, the method comprising: providing a container for infant formula food, adding the food, sealing the container with a gas-tight membrane seal, adding an inner scannable code on the gas-tight membrane seal, closing the container with a tamper-proof closure means, so that the inner scannable code is not scannable without breaking a part of the tamper-proof closure means, and storing the inner scannable code in a database.

12 Claims, 6 Drawing Sheets

(51) Int. Cl.
| | |
|---|---|
| *B65B 7/28* | (2006.01) |
| *B65B 61/26* | (2006.01) |
| *B65D 43/16* | (2006.01) |
| *B65D 51/20* | (2006.01) |
| *B65D 51/24* | (2006.01) |
| *G06K 7/14* | (2006.01) |
| *G06K 19/06* | (2006.01) |
| *G06Q 10/06* | (2012.01) |

(52) U.S. Cl.
CPC ............. *B65D 43/16* (2013.01); *B65D 51/20* (2013.01); *B65D 51/247* (2013.01); *G06K 7/1417* (2013.01); *G06K 19/06037* (2013.01); *G06Q 10/06395* (2013.01); *B65D 2251/0021* (2013.01); *B65D 2251/0093* (2013.01)

(58) Field of Classification Search
CPC ................ B65B 57/00; G06Q 30/0185; G06Q 10/06395; G06Q 10/0832; G06K 7/1417; G06K 19/06037
See application file for complete search history.

(56) References Cited

U.S. PATENT DOCUMENTS

| | | | |
|---|---|---|---|
| 2015/0298883 A1* | 10/2015 | Van Puijenbroek | A23L 33/40 206/229 |
| 2015/0355048 A1* | 12/2015 | Salg | B65B 55/08 53/167 |
| 2016/0009468 A1* | 1/2016 | Rancien | B67B 5/036 53/410 |
| 2016/0016705 A1* | 1/2016 | Alderson | B65D 43/02 493/324 |
| 2016/0176592 A1* | 6/2016 | Lorimier | B65D 51/185 220/23.89 |
| 2016/0242594 A1* | 8/2016 | Empl | A47J 31/407 |
| 2016/0374775 A1* | 12/2016 | Prpa | A61B 50/20 705/3 |
| 2017/0011334 A1* | 1/2017 | Colimon | G06K 19/06037 |
| 2017/0032382 A1* | 2/2017 | Shulman | G06Q 30/0185 |
| 2017/0341856 A1* | 11/2017 | Aschwanden | B65D 79/00 |

FOREIGN PATENT DOCUMENTS

| | | |
|---|---|---|
| WO | 2013/163661 A1 | 10/2013 |
| WO | 2017/156467 A1 | 9/2017 |

* cited by examiner

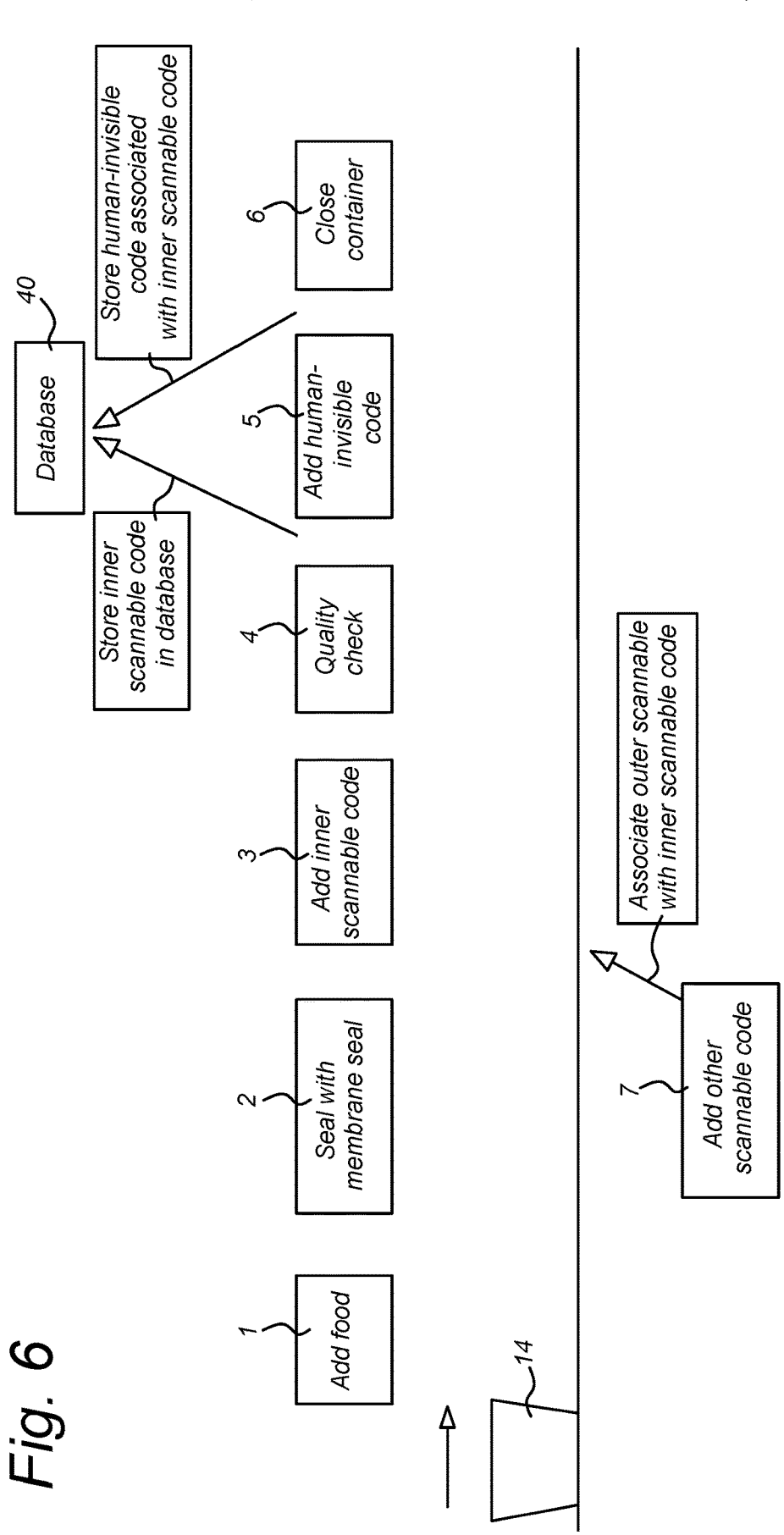

METHOD FOR PROVISIONING A CONTAINER WITH FOOD

FIELD OF THE INVENTION

The present invention relates to a method for provisioning a container with food, specifically to an anti-counterfeit method for provisioning a container with food.

BACKGROUND ART

Food products to be sold need to be stored in packages that provide the necessary preservation conditions. The authenticity of the products is of utmost importance, so that the products that reach the consumers are not counterfeited.

Different authentication techniques are known in the art, such as anti-tampering means placed on the outside of the package and that need to be broken in order to open the package, and codes that are placed outside the package and that can be scanned to receive information about the product.

However, the anti-tampering means could be imitated and provided again in a product already opened and refilled with a different product from the original, and even if codes are used, these could be copied and used in another packaging. These are mere examples of different ways in which it would be possible to counterfeit products.

Such counterfeiting risks are daily faced by the food industry. These counterfeit actions can be date code fraud, label replacement, packaging reuse or content replacement, and imitation, among others. Although there are in the art authentication mechanisms that try to avoid counterfeit, these are not safe enough and it is somewhat easy to breach the safety measures, putting at risk the safety of the food products that are to reach the consumers, and as a consequence, putting at risk the trust of the consumers in the food providers.

There is therefore a need for an anti-counterfeit method for providing a container with food that gives the container the robustness it requires to ensure that the product within the container is authentic and it does not become counterfeited. This would minimize the risk of fraud and therefore guarantee safety in the products that reach the consumers.

SUMMARY OF THE INVENTION

It is an object of the present invention to provide an improved method for providing containers with food, specifically with infant formula food, so that this method can minimize the risk that the product stored in the container can be counterfeited.

According to the present invention, a method is provided, the method comprising: providing a container for infant formula food, adding the food, sealing the container with a gas-tight membrane seal, adding an inner scannable code on the gas-tight membrane seal, closing the container with a tamper-proof closure means, so that the inner scannable code is not scannable without breaking a part of the tamper-proof closure means (e.g. by unfastening the tamper-proof closure means), and storing the inner scannable code in a database.

Such method advantageously provides a food product, such as infant formula food, in a container in a way that minimizes the risk of the product being counterfeited, and it therefore minimizes the risk that the product that reaches the consumer is not the authentic product.

This is achieved by providing a gas-tight membrane seal in the container after the product has been added to the container, said membrane seal completely sealing the container so that the product is protected prior to use. By adding an inner scannable code to the membrane seal, before or after placing the membrane seal in the container, and then adding a tamper-proof closure means, the inner scannable code can only be scanned once the tamper-proof means has been altered (unfastened, broken) and the closure means has been opened. This method therefore provides a robust mechanism in which tamper-proof closure means are used to cover the closure means for a first security level, an inner code is placed inside the container so that it can only be scanned once the container has been opened, and the inner code is specifically placed on a gas-tight membrane seal that protects the product, in such a way that if the membrane seal is opened to replace the product, a new membrane seal has to be provided in which an identical scannable code is placed, which is difficult to achieve. The fact that the inner scannable code is stored in a database allows to have a centralized control of the different products and their codes, and therefore also a control of when these codes are scanned.

In a preferred embodiment of the invention, the method further comprises performing a quality check of the container, and only storing the inner scannable code in the database on the condition that the container passes the quality check.

This quality check ensures that the inner scannable code has been placed in the correct container and that the container as well as the food product inside are authentic.

In a preferred embodiment of the invention, the method further comprises providing an outer scannable code to the container and associating the inner scannable code with the outer scannable code in the database.

An outer scannable code is provided on the outside surface of the container, and then the inner scannable code stored in the database is associated (linked) with the outer scannable code. In this way, it is ensured that both codes relate to the same container with food. If the outer scannable code is scanned, the scanner device used to scan the code, which can be implemented in a smartphone, tablet or any other suitable device, may give the consumer information about the product contained in the container (this scan can be done in the shop before purchasing the product), and may also indicate to the consumer that there is a further inner scannable code that has to be scanned in order to authenticate the product.

In a preferred embodiment of the invention, the inner scannable code is added on the gas-tight membrane seal before the gas-tight membrane seal is placed in the container.

In a preferred embodiment of the invention, the method further comprises providing the container with a human-invisible code and storing the inner scannable code in association with the human-invisible code in a further database.

In a method for provisioning a container with food according to the present invention, the inner scannable code and the outer scannable code are associated with each other. However, once the inner scannable code has been added on the membrane seal and the tamper-proof closure means has been added to close the container, the inner scannable code is no longer accessible and therefore when the outer scannable code is added on the container it might not be possible to associate the inner scannable code that is stored in the database with the outer scannable code. This can happen because the steps of filling of the container with food, sealing with the membrane seal, providing the inner scannable code and closing with the tamper-proof closure means may take place in a part of the process and the addition of the outer scannable code may take place in a different part of the process where there is no information about the inner scannable code that is no longer visible. In order to ensure that the inner scannable code is properly associated in the database with the correct outer scannable code, the container is marked with a human-invisible code, which may be added shortly after the inner scannable code is added to the membrane seal and stored in the database, or in the same step of the process, so that the inner scannable code stored in the database can be associated with the human-invisible code in a further database. It should be noted that the database where the inner scannable code is stored and the further database where the inner scannable code in association with the human-invisible code are stored may be part of the same database.

In a preferred embodiment of the invention, the method further comprises providing an outer scannable code to the container, reading the human-invisible code on the container, retrieving the inner scannable code associated with the human-invisible code from the further database and associating the inner scannable code with the outer scannable code in the database.

When the outer scannable code is to be provided on the container, it can be stored in the database in connection with the human-invisible code, and in this way the outer scannable code will be linked to the inner scannable code.

In a preferred embodiment of the invention, the method further comprises storing the outer scannable code in association with the human-invisible code in the further database, and when the outer scannable code is not sufficiently readable, reading the human-invisible code on the container, and retrieving the outer scannable code associated with the human-invisible code. Sufficiently readable can be understood as being possible to scan the code with a suitable device and retrieve a valid result.

In the process of manufacturing the container of the present invention, after the outer scannable code has been provided, the container may go to a different part of the process to undergo subsequent manufacturing steps. When the container is completely finished, it may need to be properly placed in a case, or container, which may be subsequently placed in a pallet or shelf. During this process it is possible that the container is placed in a position from which the outer scannable code cannot be properly read, due to for example the fact that several containers are placed close to each other and the outer scannable code is located on a side of the container. In this case, if the human-visible code is provided in a place where it can be properly read, the human-invisible code can be scanned at any time during the process and the outer scannable code can be retrieved, because the human-invisible code and the outer scannable code are associated (linked) to each other in the database.

Therefore, by using only one human-invisible code, the safety provisions in the manufacturing process can additionally be improved in a simple manner. This is because the human-invisible code may first be linked to the inner scannable code in order to associate the inner scannable code with the outer scannable code, and the human-invisible code can also be used to be linked to the outer scannable code, so that the outer scannable code can be retrieved from the human-invisible code when the human-invisible code is more accessible to read than the outer scannable code. The container can always during the manufacturing process be tracked in an efficient manner and it can be ensured that the content provided in the container is authentic.

In a preferred embodiment of the invention, the inner and/or the outer scannable code is a QR code.

In a preferred embodiment of the invention, the gas-tight membrane seal comprises a tear strip and a pull tab configured to tear the tear strip along a tear path and to leave a part of the gas-tight membrane seal in the container. This advantageously leaves a part of the membrane seal in the container, namely the parts of the membrane seal that are in contact with the container, and it therefore becomes difficult to replace without this being noticeable.

In a preferred embodiment of the invention, the inner scannable code is added on the side of the gas-tight membrane seal facing the content of the container. In a preferred embodiment of the invention the inner scannable code is added on the side of the gas-tight membrane seal facing away from the content of the container.

In a preferred embodiment of the invention, adding the inner scannable code comprises marking the membrane seal with a laser marked visible code. In a preferred embodiment of the invention, adding the outer scannable code comprises marking the part of the container with a laser marked visible code. Laser marking is an effective technique that makes counterfeit difficult because the laser removes a layer of material in order to make the mark, and it can thus not easily be erased as is the case with other techniques such as inkjet.

BRIEF DESCRIPTION OF THE DRAWINGS

The present invention will be discussed in more detail below, with reference to the attached drawings, in which:

FIG. 6 illustrates a workflow of a method for providing a container with food according to the present invention

DESCRIPTION OF EMBODIMENTS

Figure 1:
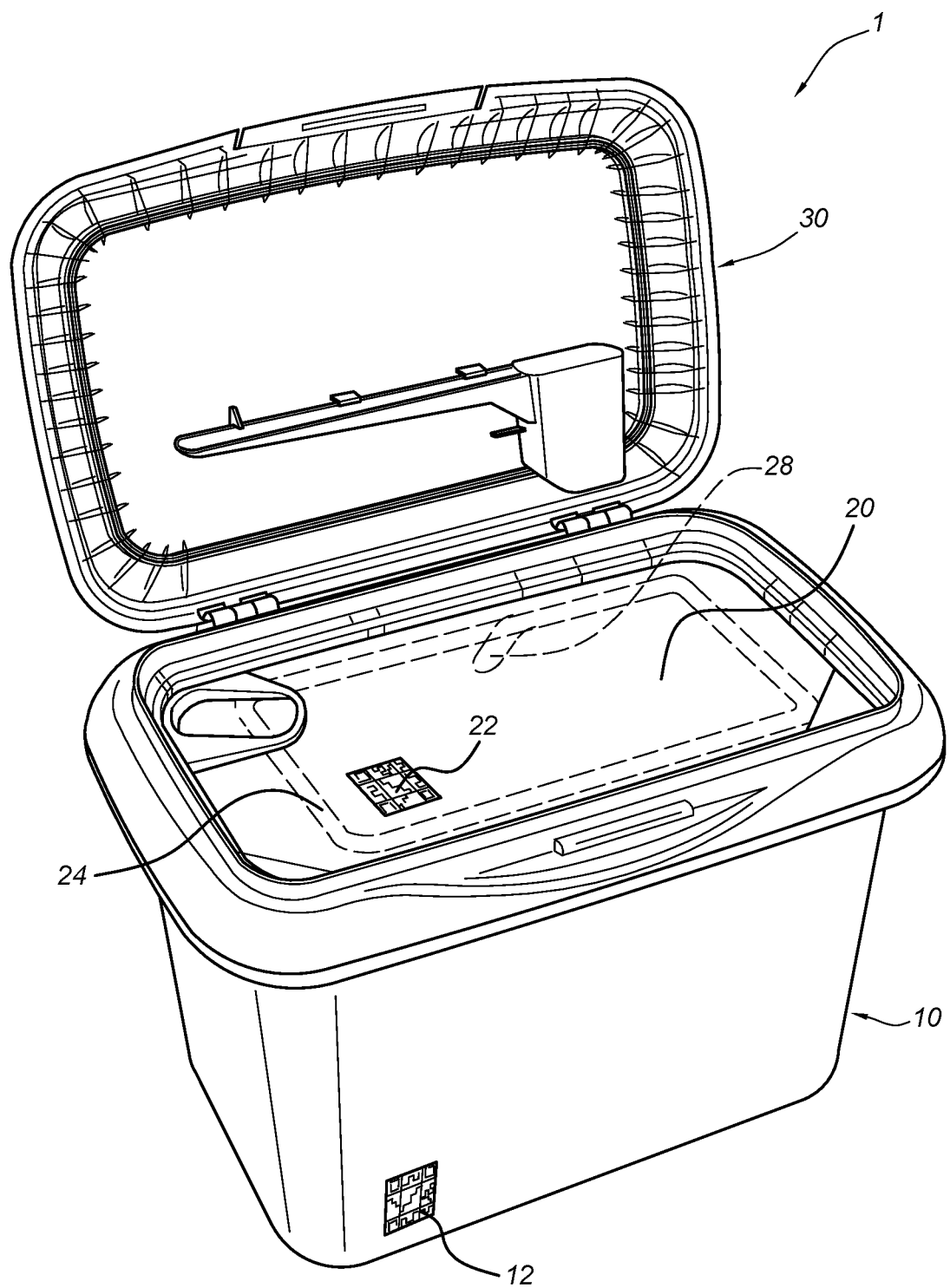
FIG. 1 illustrates a container according to the present invention in a position where the closure means is open

FIG. 1 depicts a container according to the present invention in a position where the closure means is open A container 1 according to the present invention comprises a container body 10 in which food, preferably infant formula food, is to be placed. The container further comprises a lid 30 that is configured to close the container and protect the food content. The lid 30 may comprise a closure means 32 that allows the lid to be opened and closed so that the container can then be closed for a future use and the food can therefore be protected. The lid may further comprise a tamper-proof closure means 34 (not shown in this figure) to further secure the closure means 32, so that the closure means can only be opened for the first time after breaking or altering the tamper-proof closure means 34. If a consumer who is to open the lid for the first time sees that the tamper-proof closure means 34 is not intact, it is a sign that the product might have already been opened and that it might not be authentic. The tamper-proof closure means 34 may be a sleeve wrapped around the container and the lid 30, or a sticker added that leaves evidence behind once it has been tampered with, or the like.

The container may further comprise a membrane seal 20, which is preferably a gas-tight membrane seal, which is located under the lid 30 and covers the food containing space, sealing the product prior to use. The membrane seal 20 is preferably attached to the container by mechanisms that do not require glue, which is of paramount importance in a container suitable for infant formula food. The membrane seal 20 may be attached to the container using ultrasonic welding or induction sealing, or any other mechanism that does not require gluing or that is appropriate for infant formula food containers. The membrane seal 20 may be made of a material that makes it suitable for protecting food content and that also allows it to be attached to the container. The membrane seal 20 may comprise a plastic, metal or plastics-metal foil.

In order to access the food inside the container, the membrane seal 20 needs to be opened. In a preferred embodiment of the invention, the membrane seal 20 may have a tear strip 24 configured to be torn along a tear path 26 and to leave a part of the membrane seal 20 in the container. With this opening mechanism, a part of the membrane seal 20 is left in the container when the tear strip 24 is torn, and the membrane seal 20 is therefore not completely removed when opened, which has the advantage that once the membrane seal 20 has been opened it is extremely difficult to remove the rest and replace it with a new one without this being noticeable.

The tear strip 24 may comprise a pull tab 28 (not visible in this figure) that allows a consumer to easily pull the tear strip 24 to open the membrane seal 20.

The container according to the present invention is additionally provided with at least two scannable codes. In a preferred embodiment of the invention, an outer scannable code 12 may be provided on the container so as to be scannable without unfastening the tamper-proof closure means 34 and the closure means 32. This outer scannable code 12 may be placed on the outer part of the container body 10 or on the outer part of the lid 30.

An inner scannable code 22 is furthermore provided on the membrane seal 20 so as to be only scannable after breaking the tamper-proof closure means 34 and the closure means 32. The inner scannable code may be provided in the membrane seal before the membrane seal is placed in the container, or the inner scannable code may be provided in the membrane after the membrane seal has been placed in the container. The inner scannable code 22 is therefore configured to be scanned only when the lid has been opened. The outer scannable code 12 and the inner scannable code 22 may be associated with each other. This means that they both have interrelated information about the product and the container. When the outer scannable code 12 is scanned, a message may be shown indicated that a further inner scannable 22 code is located inside the container. Since both codes are associated, when each of the inner 22 or outer 12 scannable codes is scanned, information is sent to the database where they are stored, and therefore information on one scannable code is updated when the other scannable code is scanned. When an outer scannable code 12 is scanned it may show a message indicating that for example the inner scannable code 22 associated therewith has already been scanned, in which case the consumer can know that the product has been counterfeited.

Figure 2:
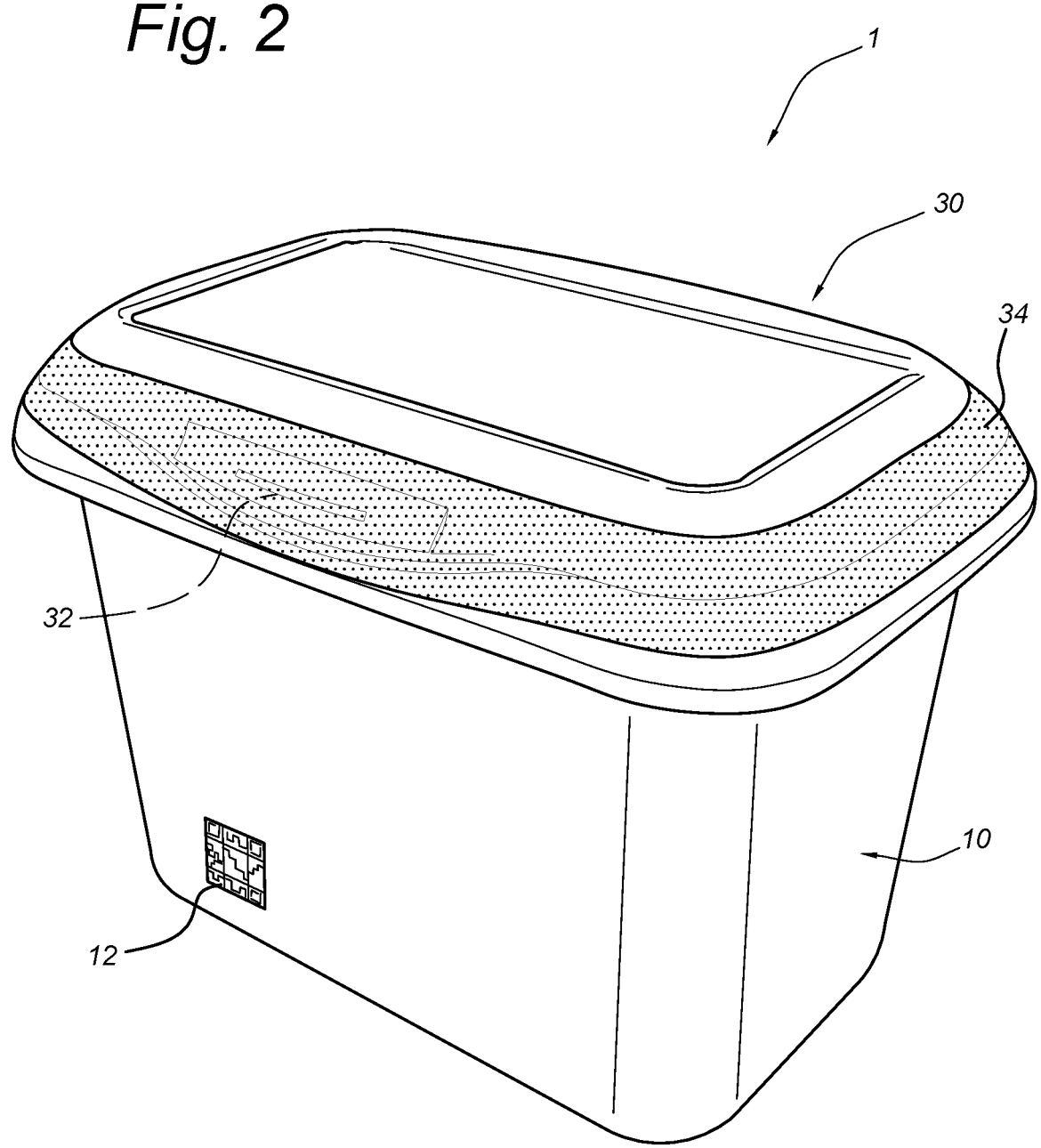
FIG. 2 illustrates a container according to the present invention in a closed position

FIG. 2 illustrates a container according to the present invention in a closed position. FIG. 2 therefore shows the container body 10 and the lid 30 with the closure means 32. FIG. 2 furthermore shows tamper-proof closure means 34 which as an example has a form of a sleeve that is wrapped around the container body 10 and the lid 30 and that does not allow the closure means 32 to be opened without the tamper-proof closure means 34 being broken or altered. Since the tamper-proof closure means 34 cannot be put back intact once it has been altered, it allows a consumer to identify whether the product has been opened before purchasing it.

When the product is in the store, a consumer may scan the outer scannable code 12 with a suitable code scanner, which can be implemented in a smartphone or tablet, or any other suitable device. The outer scannable code 12 may provide information about the product, and it therefore can be scanned before purchasing the product to obtain information such as the composition, the batch number, the expiration date, and other useful information.

Figure 3:
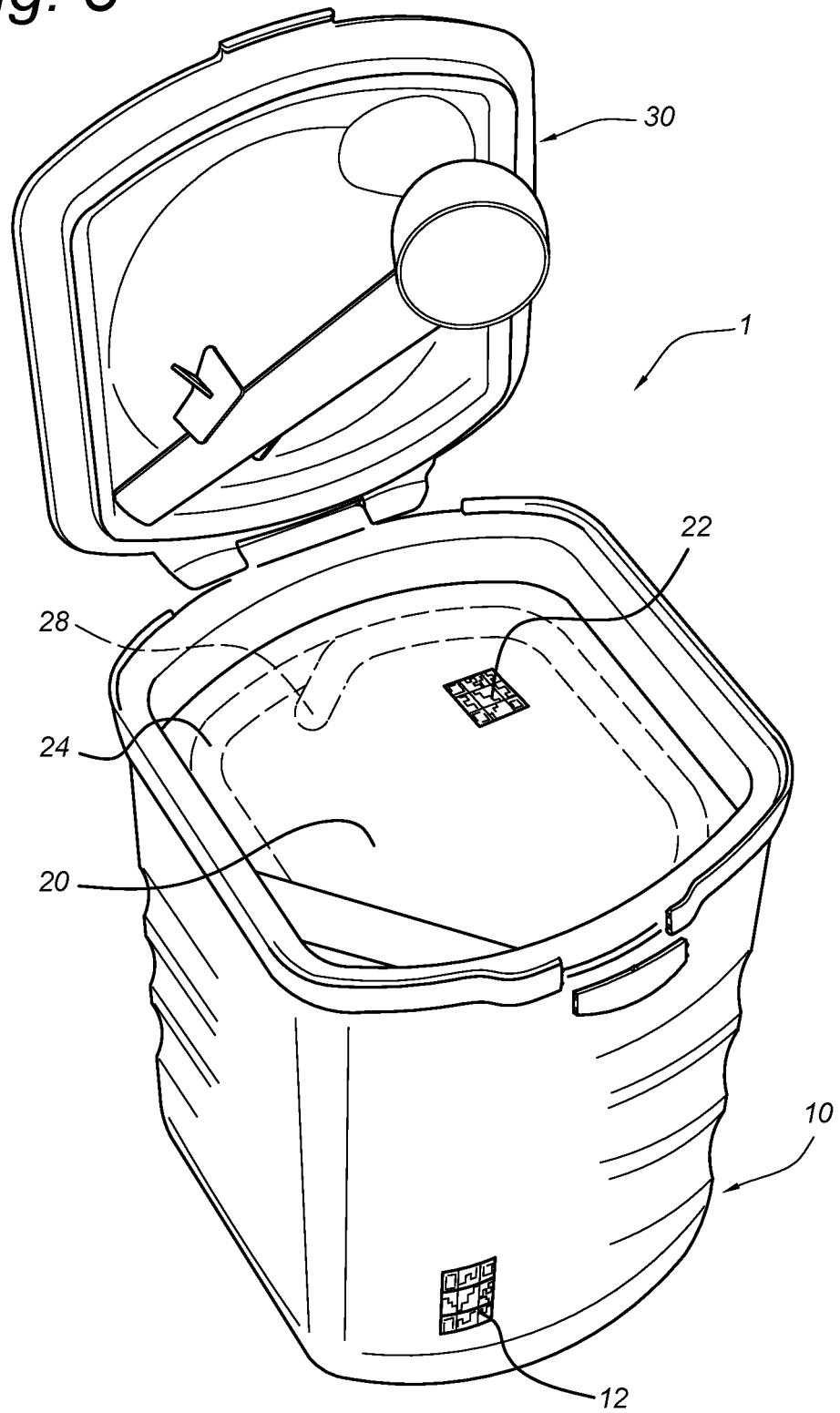
FIG. 3 is a container according to the present invention in a position where the closure means is open

FIG. 3 illustrates a container according to the present invention in a position where the closure means is open. The inner scannable code 22 is preferably located in the membrane seal 20, more preferably on the outer part of the membrane seal 20 facing away from the food content. The inner scannable code 22 may also be placed on the inner part of the membrane seal 20 facing the food product. This has the advantage that not only the lid 30 has to be opened and the tamper-proof closure means 34 altered before the inner code 22 can be scanned, but also the membrane seal 20 has to be opened before the inner code 22 can be scanned, and this makes it more difficult to counterfeit the product, because replacing the membrane seal 20 with the code once it has been opened is considerably difficult due to the trace that the membrane seal 20 leaves.

In the example of FIG. 3 the inner scannable code 22 is placed on the outer part of the membrane seal 20. It can be seen that the inner scannable code 22 may only be scanned once the lid 30 has been opened, and therefore once the tamper-proof closure means 34 has been altered. The inner scannable code 22, when scanned, may provide information indicating whether the code has already been scanned or not. The first time the inner scannable code 22 is scanned, the code scanner, which can be running in a smartphone, tablet, or other suitable reader, may send a message to a server that stores information about the codes placed in the different products, so that the server can record that the inner code has been scanned once. When the inner scannable code 22 is scanned a second time, and the code reader sends a message to the server, the server will recognize that the code has already been scanned and will send a message back to the code reader with a warning. In this way, if a consumer scans the inner code and a warning is shown, he knows that the inner scannable code 22 has already been scanned once and that the product may therefore not be authentic.

The inner scannable code 22 and the outer scannable code 12 may preferably be laser marked visible codes. This has the advantage that the marks left by laser marking cannot easily be changed since the laser beam removes the top layer.

The inner scannable code 22 and the outer scannable code 12 may preferably be QR codes, but any other suitable code that is easy to read by a consumer device can also be used.

A third code which is a human-invisible code may be used. In a method for provisioning a container with food according to the present invention, the inner scannable code 22 and the outer scannable code 12 are associated with each other in a database. However, once the inner scannable code 22 has been added on the membrane seal 20 and the tamper-proof closure means 34 has been added to close the container, the inner scannable code 22 is no longer accessible and therefore when the outer scannable code 12 is added on the container it might not be possible to associate the inner scannable code 22 that is stored in the database with the outer scannable code 12. This can happen because the steps of filling of the container with food, sealing with the membrane seal 20, providing the inner scannable code 22 and closing with the tamper-proof closure means 34 may take place in a part of the process and the addition of the outer scannable code 12 may take place in a different part of the process where there is no information about the inner scannable code 22 that is no longer visible. In order to ensure that the inner scannable code 22 is properly associated in the database with the correct outer scannable code 12, the container is marked with a human-invisible code, which may be added shortly after the inner scannable code 22 is added to the membrane seal and stored in the database, or in the same step of the process, so that the inner scannable code 22 stored in the database can be associated with the human-invisible code in a further database. The database where the inner scannable code 22 is stored and the further database where the inner scannable code 22 in association with the human-invisible code are stored may be part of the same database.

When the outer scannable code 12 is to be provided on the container, it can be stored in the database in connection with the human-invisible code, and in this way the outer scannable code will be linked to the inner scannable code 22. The human-invisible code may be provided on the container using suitable techniques, such as using an invisible ink, which can then be made visible using different methods depending on the type of ink. By way of example, the ink may be made visible by applying heat, a specific chemical, or being illuminated by ultra violet (UV) light.

After the outer scannable code has been provided, the container may go to a different part of the process to undergo subsequent manufacturing steps, and when the container is completely finished, it may need to be properly placed in a case, or container, which may be subsequently placed in a pallet or shelf. During this process it is possible that the container is placed in a position from which the outer scannable code cannot be properly read, due to for example the fact that several containers are placed close to each other and the outer scannable code is located on a side of the container in close proximity to other containers. In this case, the human-visible code can be provided in a place such that it can be properly read, and because the outer scannable code has been stored in the data base in connection with the human-invisible code, the human-invisible code can be scanned at any time during the process, allowing the outer scannable code to be retrieved.

Figure 4:
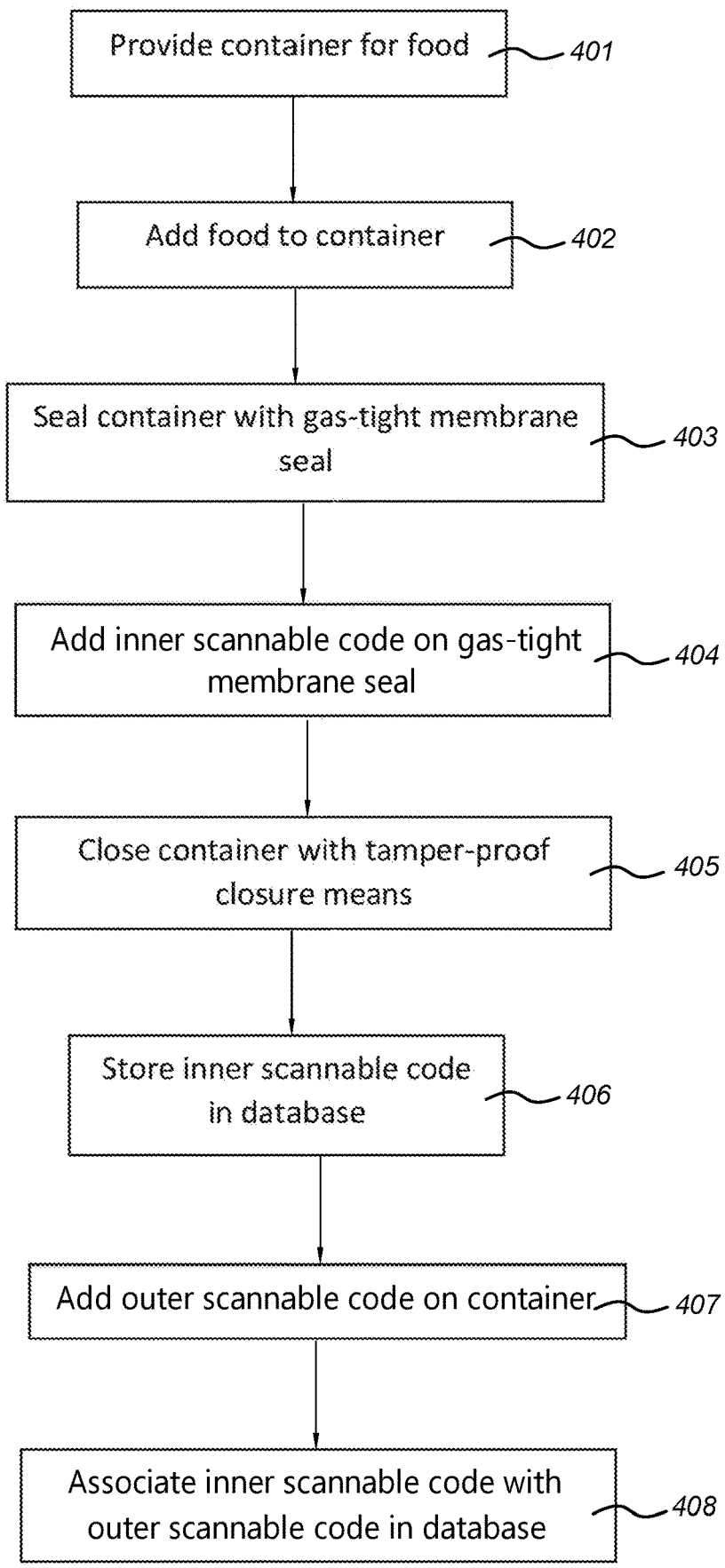
FIG. 4 depicts a flow chart of a method for providing a container with food according to the present invention

FIG. 4 depicts a flow chart of a method for providing a container with food according to the present invention.

According to an embodiment of the present invention, first a container for food, preferably infant formula food is provided in step 401, and food is added to the container in step 402. Afterwards the membrane seal 20 as defined in relation with the previous figures is added and the container is therefore sealed with the preferable gas-tight membrane seal 20 in step 403. An inner scannable code 22 is then added on the membrane seal 20 in step 404, and the container is then closed with tamper-proof closure means 34 in step 405. Once the container is closed, the inner scannable code 22 is stored in a database in step 406. Steps 405 and 406 may be swapped, so that after adding the inner scannable code 22 it is stored in the database and then the container is closed.

After the container has been closed and the inner scannable code 22 has been stored in the database, an outer scannable code 12 is added on the outer surface of the container (on the outer body 10 or on the lid 30) and the inner scannable code 22 is associated with the outer scannable code 12 in the database.

In an embodiment of the present invention, both the inner scannable code and the outer scannable code may be provided at the same time, before the container is closed, and they are both stored in the database at the same time.

Figure 5:
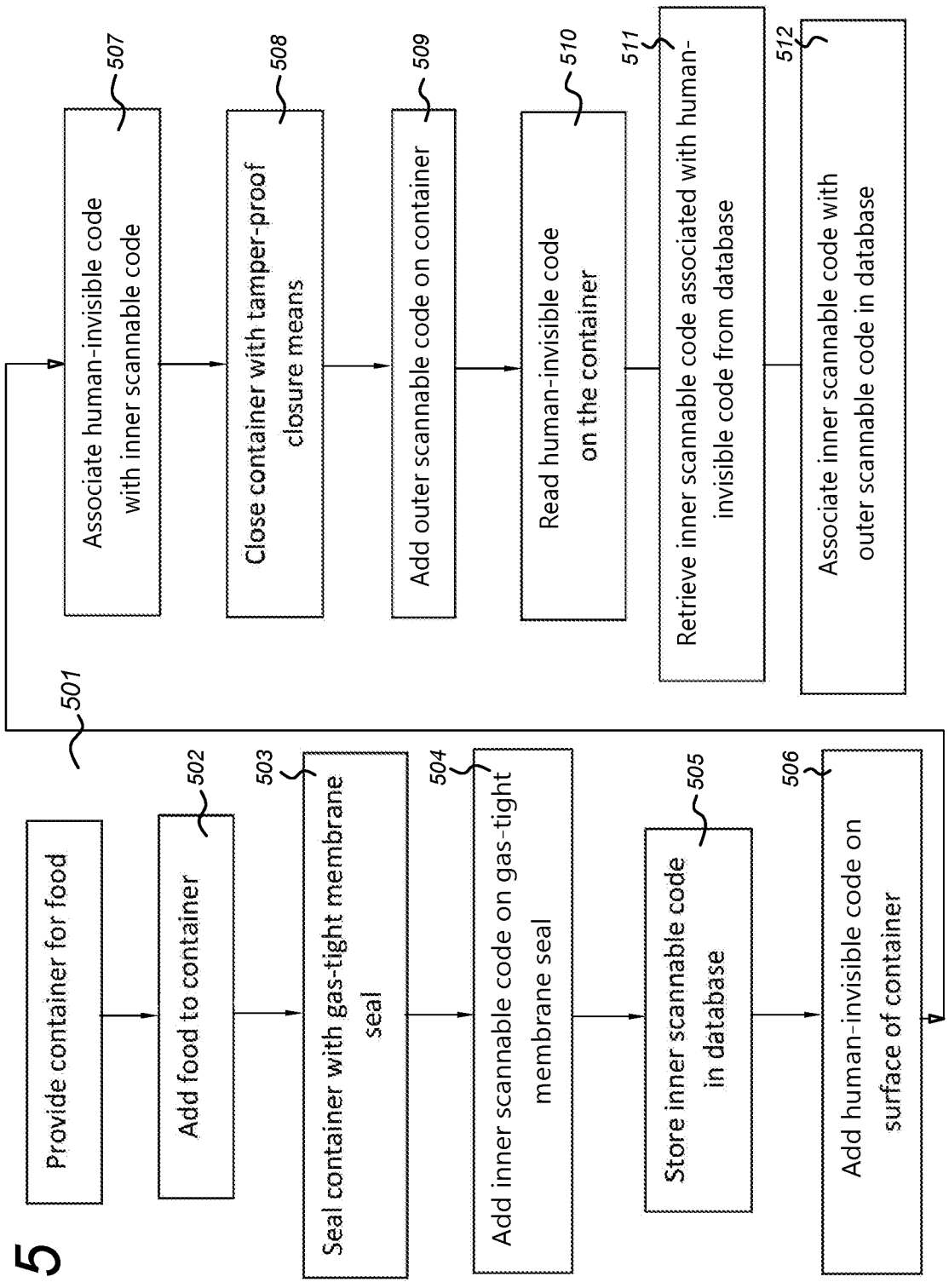
FIG. 5 shows a flow chart of a method for providing a container with food according to the present invention

FIG. 5 shows a flow chart of a method for providing a container with food according to the present invention.

In an embodiment according to the present invention it may happen that the provision of the inner scannable code 22 and the outer scannable code 12 do not take place in the same place during the provisioning process. Steps 501 to 504 are similar to steps 401 and 404 of FIG. 4. In step 505 the inner scannable code 22 is stored in a database. In step 506 a human-invisible code is added on the surface of the container. This human-invisible code is then associated with the inner scannable code 22 and the associated codes are stored in a database in step 507, which can be the same database where the inner scannable code 22 is stored or a different database.

After the codes are associated the container is closed with the tamper-proof closure means 34 in step 508.

Afterwards the outer scannable code 12 is added on the outer surface of the container in step 509. In this scenario, instead of directly associating the outer scannable code 12 with the inner scannable code 22, since the inner scannable code 22 is not known, the human-invisible code is read in step 510, and the inner scannable code 22 is retrieved in step 511 from the further database where it is stored in association with the human-invisible code. Once the inner scannable code 22 is retrieved, it is associated with the outer scannable code 12 and both are stored associated in the database.

FIG. 6 illustrates a workflow of a method for providing a container with food according to the present invention.

The workflow of the method according to the invention represented in FIG. 6 illustrates how the container 1 is first provided. In step 1) the food is added, in step 2) the container is sealed with a membrane seal 20, and in step 3) an inner scannable code 22 is added on the membrane seal. In step 4) preferably a quality check is performed in which it is analysed whether the inner scannable code 22 has been provided to the correct product, and it may also be checked that the membrane seal 20 safely protects the food inside the container. The quality check can also be performed before the inner scannable code is provided, in order to check that the membrane seal safely protects the food.

After this quality check, if the inner scannable code 22 has not yet been provided, it is provided, and then the inner scannable code 22 is stored in a database 40. In step 5), if necessary, a human-invisible code is added on the outer surface of the container, and the human-invisible code is associated with the inner scannable code 22 in a database, which can be database 40 or a different database. In step 6) the container is closed with the tamper-proof closure means 34. Step 7) can be carried out in the same place or in a different place where there is no information about the inner scannable code 22.

In step 7), thus, the outer scannable code 12 is added on the outer surface of the container. If the human-visible code was used, this human-invisible code is read and the inner scannable code 22 associated with it is retrieved from a database. Once the inner scannable code 22 is retrieved, the outer scannable code 12 is associated with the inner scannable code 22 in the database 12.

In yet a further step (not shown), after the outer scannable 12 code has been provided, the container may go to a different part of the process to undergo subsequent manufacturing steps, and when the container is completely finished, it may need to be properly placed in a case, or container, which may be subsequently placed in a pallet or shelf. During this process it is possible that the container is placed in a position from which the outer scannable code cannot be properly read, due to for example the fact that several containers are placed close to each other and the outer scannable code is located on a side of the container in close proximity to other containers.

In this case, the outer scannable code 12 may be also associated with the human-invisible code in the database. The human-visible code can be provided in a place such that it can be properly read, and thus the human-invisible code can be scanned at any time during the process, allowing the outer scannable code to be retrieved, as the human-invisible code and the outer scannable code are associated (linked) to each other in the database.

The method according to the present invention therefore allows for efficient and safe food provisioning in a container, wherein an inner code 22 placed on a membrane seal 20 can be scanned only when a tamper-proof closure means 34 that closes the container is opened, and an outer code 12 associated with the inner code can be at any time scanned and gives information about the product and its authentication features. The present invention therefore makes it difficult for counterfeiters to fake, alter or in any way tamper a food product, preferably infant formula food, which is contained in the container following the method of the present invention.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE SYMBOLS

Similar reference numbers that have been used in the description to indicate similar elements (but differing only in the hundreds) have been omitted from the list below, but should be considered implicitly included.
1 Container
10 Container body
12 Outer scannable code
20 Membrane seal
22 Inner scannable code
24 Tear strip
26 Tear path
28 Pull tab
30 Lid
32 Closure means
34 Tamper-proof closure means
40 Database

The invention claimed is:

1. A method for providing a container with food, the method comprising:
providing a container for infant formula food,
adding the food,
sealing the container with a gas-tight membrane seal,
adding an inner scannable code on the gas-tight membrane seal,
closing the container with a lid comprising a tamper-proof closure means, so that the inner scannable code is not scannable without breaking a part of the tamper-proof closure means,
storing the inner scannable code in a database,
providing the container with a human-invisible code, and
storing the inner scannable code in association with the human-invisible code in a further database.

2. The method according to claim 1, further comprising performing a quality check of the container, and
only storing the inner scannable code in the database on the condition that the container passes the quality check.

3. The method according to claim 1, further comprising:
providing an outer scannable code to the container, and
associating the inner scannable code with the outer scannable code in the database.

4. The method according to claim 1, wherein the inner scannable code is added on the gas-tight membrane seal before the gas-tight membrane seal is placed in the container.

5. The method according to claim 4, further comprising:
providing an outer scannable code to the container,
reading the human-invisible code on the container,
retrieving the inner scannable code associated with the human-invisible code from the further database, and
associating the inner scannable code with the outer scannable code in the database.

6. The method according to claim 4, further comprising:
storing an outer scannable code in association with the human-invisible code in the further database,
when the outer scannable code is not sufficiently readable, reading the human-invisible code on the container, and retrieving the outer scannable code associated with the human-invisible code.

7. The method according to claim 1, wherein the inner scannable code and/or an outer scannable code is a QR code.

8. The method according to claim 1, wherein the gas-tight membrane seal comprises a tear strip and a pull tab configured to tear the tear strip along a tear path and to leave a part of the membrane seal in the container.

9. The method according to claim 1, wherein the inner scannable code is added on the side of the gas-tight membrane seal facing the content of the container.

10. The method according to claim 1, wherein the inner scannable code is added on the side of the gas-tight membrane seal facing away from the content of the container.

11. The method according to claim 1, wherein adding the inner scannable code comprises marking the gas-tight membrane seal with a laser marked visible code.

12. The method according to claim 3, wherein adding the outer scannable code comprises marking the part of the container with a laser marked visible code.

\* \* \* \* \*